United States Patent [19]

Stauffer

[11] 4,185,191

[45] Jan. 22, 1980

[54] RANGE DETERMINATION SYSTEM

[75] Inventor: Norman L. Stauffer, Englewood, Colo.

[73] Assignee: Honeywell Inc., Minneapolis, Minn.

[21] Appl. No.: 912,688

[22] Filed: Jun. 5, 1978

[51] Int. Cl.² .............................................. G01J 1/20
[52] U.S. Cl. ...................................... 250/204; 354/25
[58] Field of Search .............. 250/201, 204, 209, 216, 250/578; 356/141, 152, 4; 354/25

[56] References Cited

U.S. PATENT DOCUMENTS

| | | |
|---|---|---|
| 3,274,914 | 9/1966 | Biederman et al. |
| 3,836,772 | 9/1974 | Stauffer ................................. 250/204 |
| 3,838,275 | 9/1974 | Stauffer ................................. 250/209 |
| 3,875,401 | 4/1975 | Stauffer ................................. 250/201 |
| 3,904,870 | 9/1975 | Stauffer ................................. 354/25 |
| 3,906,219 | 9/1975 | Stauffer ................................. 250/204 |
| 3,945,023 | 3/1976 | Stauffer ................................. 354/25 |
| 3,958,117 | 5/1976 | Stauffer ................................. 250/201 |
| 4,002,899 | 1/1977 | Stauffer ................................. 250/209 |
| 4,071,297 | 1/1978 | Leitz et al. ................................. 356/4 |
| 4,083,056 | 4/1978 | Nakamura et al. ................... 250/201 |

Primary Examiner—David C. Nelms
Attorney, Agent, or Firm—Charles J. Ungemach

[57] ABSTRACT

A system for determining the range to an object utilizing a plurality of radiation responsive detectors such as charge coupled devices arranged in groupings where a first grouping of detectors receives radiation from the object primarily through a first portion of a lens and a second grouping of the detectors receives radiation from the object primarily through a second portion of the lens. There is a predetermined relationship between the outputs of the detectors in the first grouping with respect to the detectors in the second grouping when the object is at a predetermined range and changes in the range of the object produce changes in the relationship so as to produce a resultant signal which varies with the range and which may be used for the automatic focussing of photographic or television cameras.

10 Claims, 15 Drawing Figures

RANGE DETERMINATION SYSTEM

BACKGROUND OF THE INVENTION

The present invention relates generally to apparatus for providing a measure of the distance between the apparatus and a remote object and has particular importance in fields of distance determining and automatic focusing of, for example, photographic or television cameras.

Distance determining and automatic focusing arrangements have received considerable attention in recent years. One advantageous type of distance determining automatic focus apparatus is the spatial image correlation type. Examples of the different forms of arrangements of this type can be found in my U.S. Pat. Nos. 3,836,772, 3,838,275, 3,958,117, 4,002,899 and in U.S. Pat. No. 3,274,914 by Beterman et al.

The typical spatial image correlation apparatus includes two auxiliary optical elements (e.g., lenses or mirrors) and two detector arrays upon which images are formed by the optical elements. The object distance is determined by moving one of the auxiliary optical elements so as to change the relative position of the images on the radiation responsive detector arrays until they occupy a critical or correlation position. This position is a measure of the existing object to apparatus distance.

The relative movement of the auxiliary optical element and the detector array occurs for each distance measuring or focusing operation. The critical or correlation position occurs when there is best correspondence between the radiation distributions of two auxiliary or detection images formed on the two detector arrays. This condition of best distribution or correspondence results in a unique value or effect in the processed electrical output signals.

In most systems, a relative movement of the auxiliary optical element with respect to the detector arrays is achieved by moving a lens or mirror relative to one of the detector arrays. The particular position of the element when best distribution correspondence occurs provides a determination of the existing object apparatus distance. In an automatic focusing system, the position of the auxiliary optical element at the time of correlation is used to control the position of a primary optical element, such as a camera taking lens.

Although distance determining and automatic focusing arrangements of this type have many advantages, they also have some disadvantages. In particular, the required movement of an auxiliary optical element and the accurate determination of the position of that element when correlation occurs leads to considerable mechanical and electrical complexity. It also requires some form of motor means to provide the motion of the auxiliary optical element. This can create a problem particularly in automatic focusing cameras in which size and weight constraints are critical. The additional complexity of the requirement of some form of motor means increases the cost as well as weight and size and increases the likelihood of mechanical failure.

Several systems have been proposed that do not require scanning mirrors or lenses. For example, in my U.S. Pat. No. 3,945,023 I disclose a scheme where the outputs of detectors in two detector arrays of unequal length are compared and processed to provide an indication of the distance to the object. The primary lens is moved to a particular zone depending upon the result of this processing. In such a system for high accuracy, a relatively large number of zones is required and as a result the signal processing required for this system is also fairly large. In my copending application Ser. No. 876,972 filed Feb. 13, 1978, I disclose a system which provides for greater accuracy by combining the outputs of signals of various detectors in a predetermined manner to produce smaller size zones without decreasing the fixed detector sizes. There are, however, still size limitations that prevent the obtaining of very small zones and thus there are limits on the accuracy. In my copending application Ser. No. 696,170 filed June 14, 1976, I disclose a digital auto focus system which employs a large plurality of very small detector elements in the form of a charged couple device (CCD) or charge injection device (CID) array. In this disclosure, a first detector array receives a first detection image of the object and the second detector array receives a second detection image of the object. The second detection image is displaced by a number "n" of detectors in the second detector array with respect to the corresponding detectors of the first detector array. The number "n" is indicative of the distance between the object and the first and second detector arrays. While this system significantly increases the accuracy possible, it still requires that there be two detector arrays and two separate lenses to form paths for light from a remote object to each of the arrays. This has the effect of increasing the size, cost and complexity of the system and also makes it difficult to be used in a through-the-lens type camera.

SUMMARY OF THE INVENTION

The apparatus of the present invention utilizes a single lens to receive radiation from a remote object and to create a first intensity distribution for the radiation from the remote object on a first plane when the lens is in a first position with respect to that plane. If the remote object moves closer to the lens, the intensity distribution on the predetermined plane changes since there is a change in the position of the image plane for the lens. Radiation through the lens can be considered as having a first portion which passes through a first half of the lens and a second portion which passes through a second half of the lens. As the object moves closer to the lens, radiation passing through the first half of the lens changes position with respect to radiation passing through the second half of the lens so that the intensity distributions resulting from the radiation passing through the two portions of the lens move with respect to each other by an amount which depends upon the distance to the remote object. Signal processing circuitry is provided so that the amount of change in position of the radiation distribution pattern at the plane of the detectors is determined as an indication of the distance to the remote object.

DETAILED DESCRIPTION OF THE PREFERRED EMBODIMENTS

Figure 1:
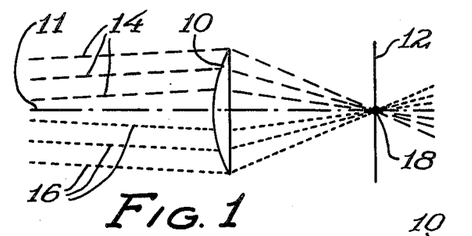
FIG. 1 shows radiation from a point of an object being focused by lens on a plane.

In FIG. 1, a lens 10 having an axis 11 is shown, lens 10 may be the taking lens of a camera and light from a remote object is shown passing therethrough to be focused on a first plane 12. In FIG. 1, light from the remote object that passes through the upper portion of lens 10 is shown as dashed lines 14 while light from the remote object passing through the lower half of lens 10 is shown as dotted lines 16. It is seen that all the radiation from a point on the remote object, which is represented by paths 14 and 16 and passing through lens 10, is focused to a point 18 on plane 12. Should the object move further away or closer to lens 10, then the image which appears on plane 12 would become blurred.

Figure 2:
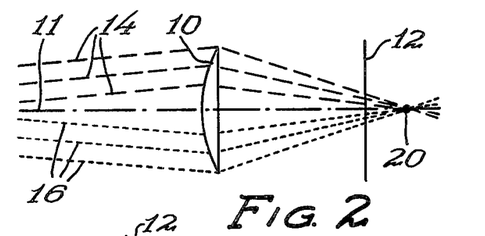
FIG. 2 shows the change of focus position of the radiation of FIG. 1 when the object is closer to the lens.

In FIG. 2, the system of FIG. 1 is shown with light passing through the lens 10 from an object which is closer to lens 10 than was the case in FIG. 1. As can be seen, radiation from the object passing through the upper portion and lower portions of lens 10 now focus at a point 20 which is beyond the plane 12. The result is that a blurred image appears on plane 12. It should be noted that the radiation which has passed through the upper portion of lens 10 appears generally above the axis 11 at plane 12 while radiation which has passed through the lower portion of lens 10 appears on plane 12 generally below the axis 11.

Figure 3:
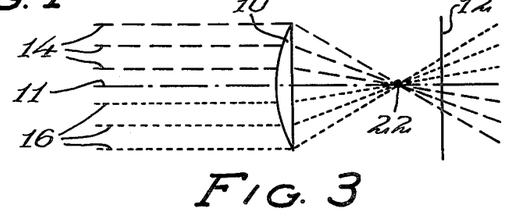
FIG. 3 shows the change of focus position of the radiation of FIG. 1 when the object is further from the lens.

In FIG. 3, the system of FIG. 1 is shown where the object is further away from lens 10 than was the case in FIG. 1 and it is seen in FIG. 3 that the radiation following paths 14 and 16 now focuses at a point 22 along the axis 11 between lens 10 and plane 12. It is also seen that the image is again blurred on plane 12 but that the radiation which has passed through the upper portion of lens 10 now lies generally below the axis 11 on plane 12 while the radiation which has passed through the lower portion of lens 10 now lies generally above the axis 11 on plane 12.

It is thus seen in FIGS. 1, 2 and 3 that radiation which has eminated from a point on a remote object either is focused directly to a point on plane 12 when lens 10 is at the proper focal distance or is focused before or after plane 12 if the point on the object is moved closer or further away from where it was in FIG. 1 and that the blurred distribution of light on plane 12 in either of the latter two cases is an indication that the lens 10 is not in proper focus. Furthermore, in the ideal single point situation of FIGS. 1-3, by determining whether light coming from the upper portion of lens 10 falls above or below the axis 11 on plane 12, it may be determined in which direction the lens 10 has to be moved in order to bring it towards the focus position.

Figure 4:
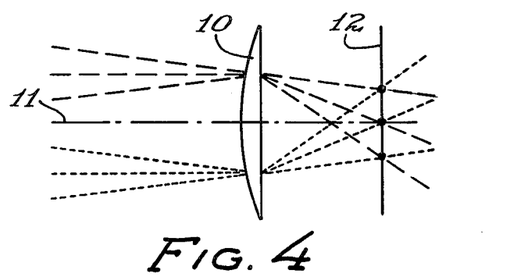
FIG. 4 shows a radiation distribution pattern for three points from an object.

FIG. 4 shows the system of FIG. 1 when it is in proper focus and shows three points from three different point sources on the remote object as points 30, 32 and 34 respectively. The intensity of light received at points 30, 32 and 34 will vary with the scene which is being viewed and, of course, the three points shown are only examples since there will be an intensity of light received on plane 12 from all of the points on the remote object and the surrounding scene within the view of the lens. The result is that plane 12 will receive a light energy distribution pattern thereon which varies with the scene being viewed.

Figure 5:
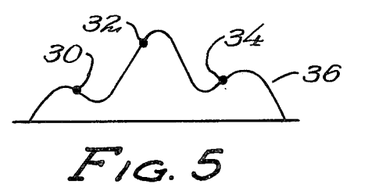
FIG. 5 shows a presumed wave form for the pattern of FIG. 4.

FIG. 5 shows how the energy distribution pattern might appear along a single line on plane 12. Curve 36 represents a curve of the intensity of light distribution at the various points along a line on plane 12 including points 30, 32 and 34 which have been shown thereon as representative points.

When the image on plane 12 is properly in focus, light from the upper and lower halves of lens 10 will be focused at the same point so that the intensity of light at point 30 is shared equally between light which has been received from the upper portion of lens 10 and light which has been received from the lower portion of lens 10. Likewise, the light intensity received at point 32 and point 34 is a result of the sum of the lights received from the upper portion of lens 10 and the lower portion of lens 10.

Figure 6:
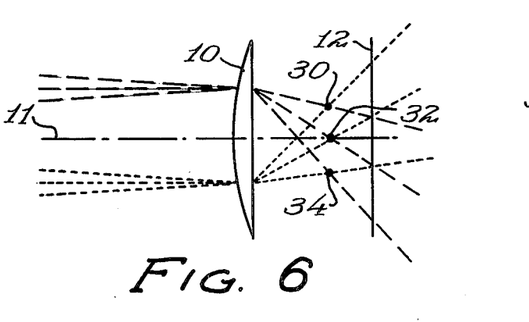
FIG. 6 shows the change of pattern of FIG. 4 when the object is further away.

FIG. 6 shows a system similar to that of FIG. 4 but where the object has moved further away from lens 10 with the result that the points 30, 32 and 34 have moved away from plane 12 towards lens 10 and the image on plane 12 is now blurred. However, it should be noticed that light from the lower portion of lens 10 contributes to the intensity of light on plane 12 at a higher level than light passing through the upper portion of lens 10.

Figure 7:
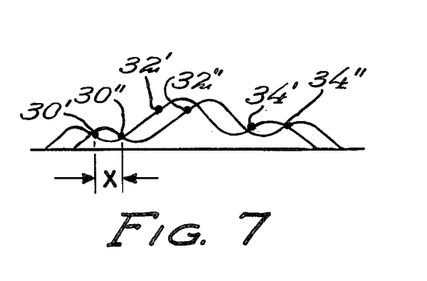
FIG. 7 shows the change in the wave form of FIG. 5 associated with the pattern of FIG. 6.

FIG. 7 shows the intensity distribution of light on plane 12 as it might exist in FIG. 6. As can be seen, there are now two curves each having about one half the amplitude but having the same general shape as the curve of FIG. 5. One of the curves is displaced with respect to the other since one of the curves represents light which is passed through the upper portion of lens 10 while the other represents light which is passed through the lower portion of lens 10. The points 30, 32 and 34 of FIG. 5 are shown in FIG. 7 as 30' and 30'', 32' and 32'', 34' and 34'', with the prime numbers representing light which is passed through the lower portion of lens 10 and the double prime numbers representing light which is passed through the upper portion of lens 10. It is seen that the two curves of FIG. 7 are displaced by an amount x from each other and this amount x is indicative of the amount of correction necessary to bring the lens 10 back into a position where the two paths for light would be again superimposed as was the case with respect to FIGS. 4 and 5. In other words, by moving lens 10 toward plane 12 in FIG. 6 light passing through the upper and lower portions of lens 10 can again be made to place points 30, 32 and 34 on plane 12.

Figure 8:
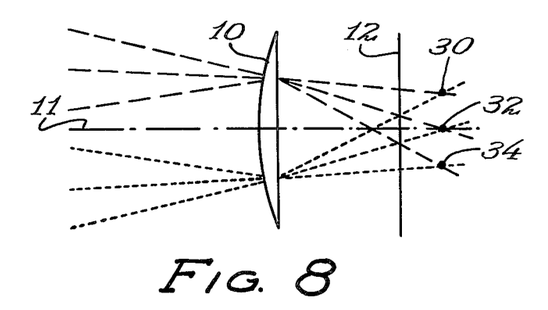
FIG. 8 shows the change of pattern of FIG. 4 when the object is closer.

FIG. 8 shows a system similar to that of FIG. 4 but where the object has moved closer to lens 10 with the result that the points 30, 32 and 34 fall on the other side of plane 12 away from lens 10 so that the image on plane 12 is again blurred. This time, however, the blur is such that light passing through the upper portion of lens 10 now is shifted generally toward the upper portion of plane 12 while light passing through the lower portion of lens 10 is shifted generally toward the lower portion of plane 12.

Figure 9:
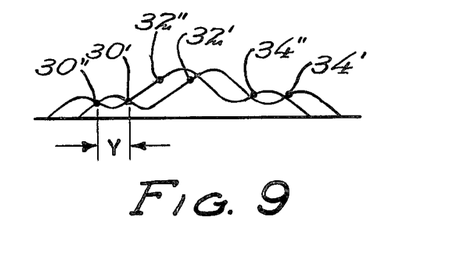
FIG. 9 shows the change in the wave form of FIG. 5 associated with the pattern of FIG. 8.

FIG. 9 shows the intensity distribution on plane 12 as, again, two curves of the same general shape and about half the amplitude of the curve in FIG. 5, one representing the light passing through the upper portion of lens 10 and the other representing the light passing through the lower portion of lens 10. Again, points 30, 32 and 34 of FIG. 5 are shown in FIG. 9 as 30' and 30", 32' and 32" and 34' and 34", respectively, as was in the case in FIG. 7, but now it is seen that point 30" occurs before point 30' since the light distribution patterns have changed in the other direction. Likewise, the point 32" occurs before point 32' and point 34" occurs before point 34'. Again, there has been a displacement of the two distribution patterns, this time by an amount shown in FIG. 9 as y. Again, it can be seen that if lens 10 is moved away from plane 12, the energy distribution patterns can again be made to coincide as in FIG. 5.

Thus, it is seen by detecting the amount of displacement between the two energy distribution patterns, the amount of error of the lens position can be determined which amount is indicative of the change in range from the lens to the remote object. Likewise, by determining the direction of shift of the light passing through the upper portion of lens 10 with respect to that passing through the lower portion of lens 10, the direction necessary to provide the desired correction may be determined.

In the above examples, the position of superimposition of the energy distribution patterns has been chosen to occur when the remote object is at some predetermined distance between the very near range and infinity and the amount of movement of the pattern created by light passing through the upper portion of the lens with respect to the pattern created by the light passing through the lower portion of the lens being indicative of the amount of movement of the object from the predetermined distance. It may be desirable in some cases to have the position where the two patterns are superimposed to occur when the remote object is at the near range or at infinity. In such case, the amount of change in the position of the patterns will always be indicative of a change in object distance in one direction; e.g., from infinity and the phase of the distribution change will not be as important since all correlations of lens position will be from one end of its travel.

Figure 10:
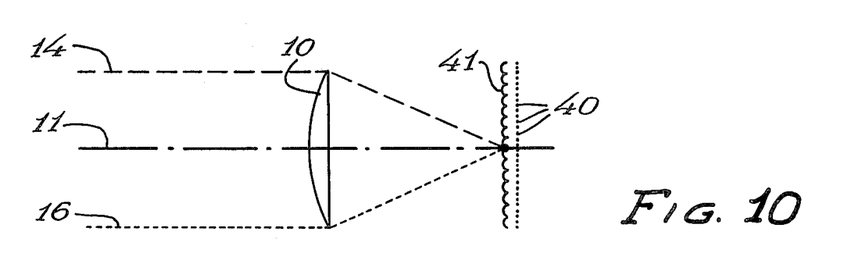
FIG. 10 shows lenses and detectors which may be utilized in the present invention.

FIG. 10 shows a system of FIG. 1 with a plurality of CCD or CID elements 40 and a number of small lenses 41 placed in a position proximate where the plane 12 of FIG. 1 would be. In FIG. 10, a single row of elements has been shown which is sufficient for most purposes although it should be understood that more than one row may be employed or other configurations such as patterns or curved rows may be used.

In FIG. 10, the elements 40, which will be presumed to the CCD elements for purposes of explanation, are shown located behind the plurality of lenses 41 which receive light from the upper and lower portions of lens 10 and split it into separate images that fall on individual pairs of the detector elements 40.

Figure 11:
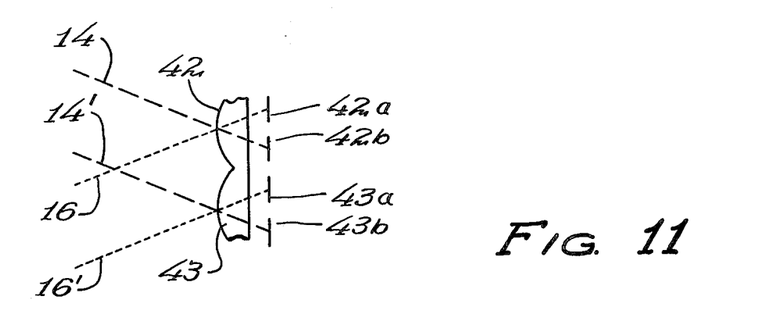
FIG. 11 shows a close up view of a portion of the lenses and detectors of FIG. 10.

The lenses 41 operate as radiation discriminating means by being located so as to receive radiation from the exit pupil of lens 10 and to create an image of the exit pupil at their image plane. Each of the small lenses thus sees the radiation from the whole exit pupil of lens 10 but the intensity of that radiation varies with the area on the remote object from which it originates. For example, in FIG. 4, the radiation at point 30 originates at some point or small area of the remote object but radiation from the entire exit pupil of lens 10 is focused at that point. Likewise, point 34 sees the entire exit pupil of lens 10 but the intensity of radiation at point 34 may be entirely different because the radiation eminates originally from a different point on the remote object. Thus each of the small lenses 41 sees the entire exit pupil of lens 10 but the intensity of light will be different for each one depending upon the emanating point on the remote object and the scene being viewed and each lens 41 produces an image of the exit pupil. The detectors 40 are placed proximate the image plane of the lenses 41 and are, for example, placed in pairs so that at a focus condition both detectors in each pair receive substantially the same intensity of radiation but each detector receives light from a different part of the exit pupil of lens 10. While the detectors in each pair receive the same intensity of radiation, from pair to pair the intensity will change with the scene being viewed. This discriminating effect of lenses 41 could also be achieved using slats, prisms, pinholes or other optical means to assure that each detector receives light from only one part of lens 10. Thus lenses 41 operate to discriminate or to break the light up into separately usable parts. This arrangement is best seen in FIG. 11 wherein four of the detector elements have been shown by reference numerals 42a, 42b, 43a and 43b. A small portion of lens arrangement 41 is shown as two lenses 42 and 43 and the lenses are shown transmitting the light received from the main lens to the CCD elements 42a, 42b, 43a and 43b respectively along paths 14, 14', 16 and 16'. Light passing through the upper portion of lens 10 is shown by dashed lines 14 and 14' and is generally received by CCD elements 42b and 43b while light passing through the lower portion of lens 10, shown by dotted lines 16 and 16', is generally received by CCD elements 42a and 43a. The cone of light defined by lines 14 and 16 is from the exit pupil of lens 10 and originates at one area or point on the remote object while the cone of light defined by lines 14' and 16' is from the exit pupil of lens 10 but originates at a different point or area on the remote object.

Thus, at a focus condition, both 42a and 42b receive the same radiation intensity as do both 43a and 43b but the upper detectors, 42a and 43a, receive radiation passing through the lower portion of lens 10 while the lower detectors, 42b and 43b receive radiation passing through the upper portion of lens 10.

The above described situation applies to the infocus condition shown in FIG. 11. Now, assume the object were to move further away from lens 10, as is the case in FIGS. 3 and 6 above. When this occurs, the small lenses 42 and 43 might receive radiation from areas that were previously received by its neighbors. For example, the dotted line 16' might now strike lens 42 so that detector 42a might now receive radiation which previously fell on 43a. Similarly, the radiation represented by dashed line 14 might now strike lens 43 and radiation previously received by element 42b might now fall on 43b. The result is that the magnitude of the radiation received by each CCD element changes from what is previously received and there is a shift of the pattern detected by the elements. Similarly, if the object were to move closer to the lens as is the case in FIGS. 2 and 8 above, then there would be a shift of radiation intensities received by the detector elements but this time in the opposite direction.

Thus, it is seen that each of the CCD elements of the array 40 in FIG. 10 will receive a magnitude of radiation which will vary with the light intensity from some portion of the object and that this will change with changes in the position of the object with respect to the lens 10.

Figure 12:
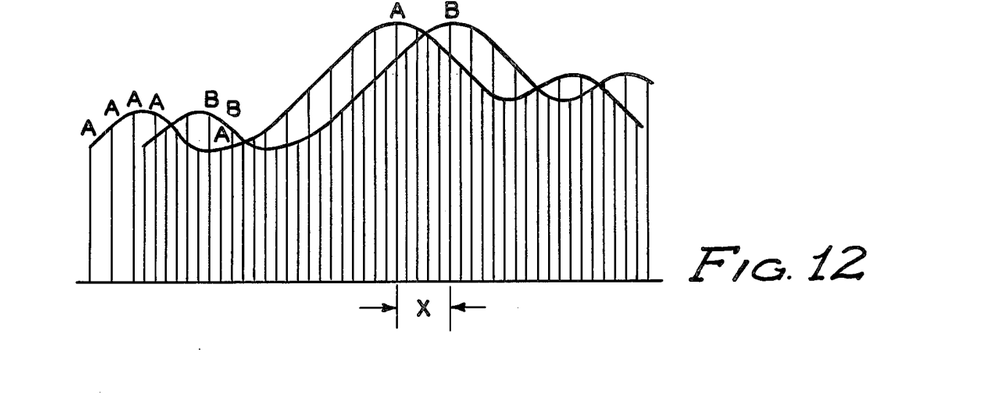
FIG. 12 shows a presumed wave form from the detectors of FIG. 10.

FIG. 12 shows a bar graph of the outputs from a plurality of CCD elements in detector array 40 when there is an out of focus condition. In FIG. 12 the outputs of each of the CCD elements in the upper half of each pair has been labelled "A" while the outputs of each of the CCD elements in the lower half of each pair has been labelled "B". This labelling has been shown only part way through the curves to prevent confusion. It seen in FIG. 12 that the curves are not superimposed showing that the situation is one of out-of-focus and it can be seen that the curve represented by the peaks of points "A" would have to be moved to the right by an amount x in order for the two curves to be matched. Thus, by providing circuitry which receives the signals generated by each of the CCD elements, it may be arranged to determine at what point the outputs of the various elements would match and how far a shift in one direction or the other would be necessary to cause such a match. This total error signal would then be indicative of the amount and the direction by which the main lens 10 would have to be moved to produce a match and thus would be indicative of the range change of the object from the desired position.

Figure 13:
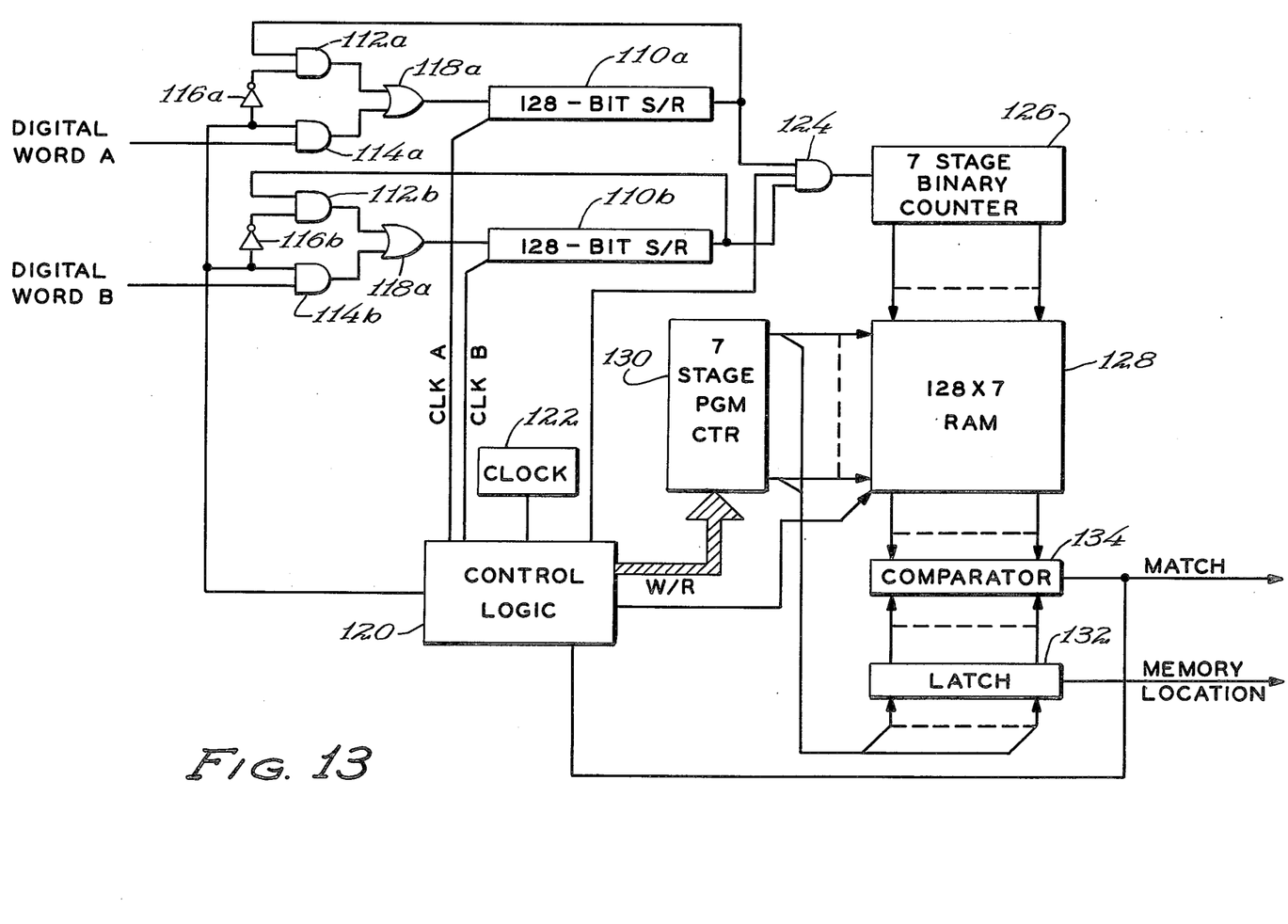
FIG. 13 shows a block diagram of a signal processing circuit usable with the present invention.

Circuitry operable to achieve this result may be found in the copending patent application of Ivars P. Breikss Ser. No. 743,259 filed Nov. 19, 1976. For convenience, this circuitry is shown in FIG. 13. In FIG. 13, digital word "A" represents the signals coming from the upper of the pairs of CCD elements in the array 40 of FIG. 10 while digital word "B" represents the signals coming from the lower of the pairs of CCD elements in array 40 of FIG. 10. The digital correlator of FIG. 13 repeatedly compares the first digital word "A" and the second digital word "B" and produces an output signal which is indicative of a number "n" which is the number of individual detector elements by which the second digital word "B" is displaced with respect to the first digital word "A" or in other words by the distance necessary to bring the two into correlation which is indicative of the distance the lens 10 has to be moved to produce a focused condition.

The two digital words are initially shifted into shift registers 110a and 110b. Logic circuits are provided with each shift register to place the shift registers in a RECIRCULATE mode after initial loading. These logic circuits include AND gates 112a, 112b, 114a and 114b; INVERTERS 116a and 116b; and OR gates 118a and 118b.

The two digital words are received by AND gates 114a and 114b. A control signal from control logic 120 is also received by AND gates 114a and 114b. The outputs of AND gates 114a and 114b are inputs to OR gates 118a and 118b respectively. The control signal from control logic 120 is inverted by INVERTERS 116a and 116b and forms inputs to AND gates 112a and 112b. The outputs of shift registers 110a and 110b are the other inputs to AND gates 112a and 112b respectively. The outputs of AND gates 112a and 112b are inputs to OR gates 118a and 118b respectively.

In operation, a logic "1" from control logic 20 enables AND gates 114a and 114b and allows new digital words to be entered into shift registers 110a and 110b. The logic "1" disables AND gates 112a and 112b so that the information presently stored in the shift registers 110a and 110b is not reentered.

After the digital words have been entered into shift registers 110a and 110b, the control signal from control logic 120 changes to a logic "0", thereby enabling AND gates 112a and 112b and disabling AND gates 114a and 114b. Shift registers 110a and 110b therefore, are in a recirculating mode.

The contents of shift registers 110a and 110b are then shifted (recirculated) in response to the two clock signals, CLK A and CLK B, supplied by control logic 120. Clock 122 provides synchronizing signals to control logic 120. Each time a logic "1" occurs at the output of registers 110a and 110b simultaneously, AND gate 124 produces an output coincident with the strobe pulse generated by control logic 120. The output pulses of AND gate 124 is counted by binary counter 126.

A number of clock pulses CLK A and CLK B correspond exactly to the number of bits in shift registers 110a and 110b. Upon completion of one complete circuit shift, the count accumulated in counter 126 is entered into random access memory (RAM) 128 at a location determined by the state of the address counter 130. At the initiation of the correlation sequence, address counter 130 is cleared. This causes the initial memory address and the first entry to occur at the lowest address. The number of counts stored at a particular location in memory 128 is an indication of the similarity between the bits of the first and second digital words during that comparison cycle.

Upon completion of the first circular shift of the contents of shift registers 110a and 110b (i.e., completion of the first comparison cycle), one extra clock pulse is produced at the clock input of shift register 110b. This shifts the contents of shift register 110b by one bit with respect to the contents of shift register 110a. At the same time, address counter 130 is incremented by 1. Counter 126 is cleared, and the second circular shift or comparison cycle of the contents of registers 110a and 110b is commenced, and the output pulses at gate 124 are again counted in counter 126. This sequence continues until the number of shifts equals the maximum value of "n" to be considered. Each time a comparison cycle is completed, the contents of counter 126 is placed in memory 128 at the next higher address obtained by incrementing address counter 130 by 1 for each complete comparison cycle.

The best correlation is the address of the largest count stored in memory 128 during the comparison cycles. The final step is the determination of this address. The largest number in memory 128 is determined as follows:

Address counter 130 is set to the highest address, which corresponds to all "1's" in address counter 130. This address is then stored in latch 132. Alternatively, the number stored in latch 132 can be derived from a source other than address counter 130. What is required is that the number stored in latch 132 initially be as high as the highest count possibly contained in memory 128 (i.e., all "1's"). The number in latch 132 must be decremented by one each time a complete check of memory 128 has found no match. Address counter 130 is a convenient means for providing the number and decrementing the number.

After the highest count is stored in latch 132, address counter 130 is sequentially decremented to zero. All locations in memory 128 are addressed in sequence and are compared to the contents of latch 132 by comparator 134. If any of the locations in memory 128 contain all "1's", comparator 134 issues an output indicating a match has occurred. At this point, one correlation process is stopped, and the particular address contained in the address counter 130 at the time is entered into latch 132. This address corresponds to the number "n".

If no match is found to the highest count, address counter 130 is decremented by one from its previous highest count and this count is stored in latch 132. The address countdown and comparison is then repeated. The process of decrementing the address and comparing the contents of memory 128 to contents of latch 132 continues until the match is found. At this point, the correlation process is concluded and comparator 134 provides a "match" output. This particular memory address at which the match occurred is the number "n". Control logic 120 causes the address to be entered into latch 132 when it receives the "match" output from the comparator 134. The output of latch 132 represents the number "n".

Since the output of latch 132 represents "n" which is indicative of the amount lens 10 has to be moved, this signal may be used to drive a motor or other motive apparatus to position lens 10 at such a position that a proper focus occurs. Other apparatus than that shown in FIG. 13 for producing the desired correlation signal will occur to those skilled in the art.

It is thus seen that I have provided a digital automatic focus system which may be used with a through-the-lens camera in which the lens 10 of the figures used in the description herein may be the taking lens of the camera and thus the system may be readily used with through-the-lens cameras and motion picture or television cameras without having to supply additional lenses for the auto focus operation.

Figure 14:
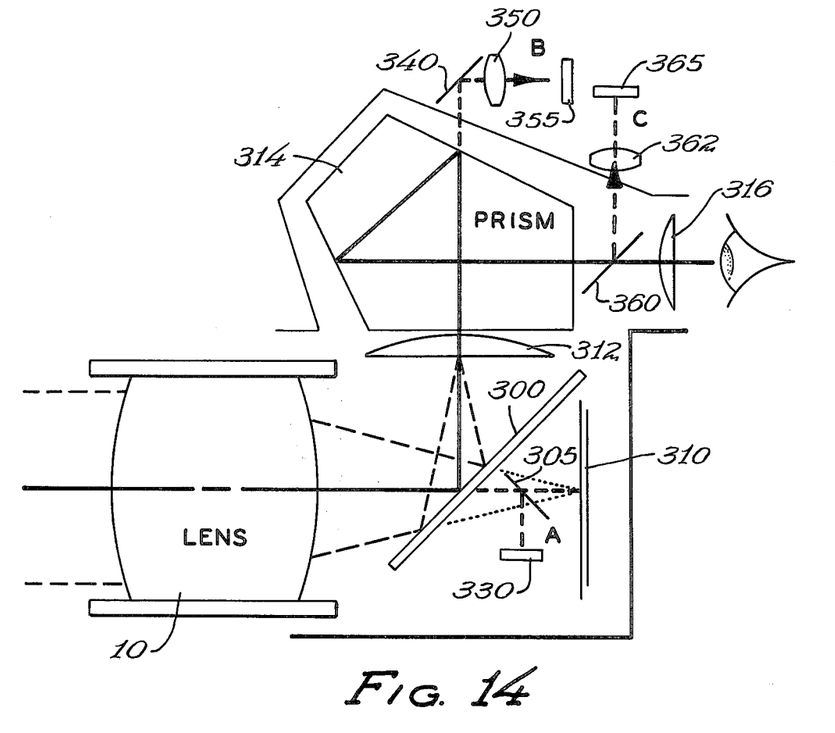
FIG. 14 shows a through-the-lens camera in cross section with several possible placements for the lens-detector combination of the present invention.

FIG. 14 shows a through-the-lens camera wherein light from the remote object passes through taking lens 10 to a half silvered mirror 300 and therethrough to a mirror 305. Mirrors 300 and 305 are normally moved or folded during the picture taking operation so that light from lens 10 passes to film 310. Light is reflected off the surface of mirror 300 through a lens 312 into a prism 314 where it is internally reflected twice and passes through a lens 316 to the eye of the photographer so that he may have a view of the scene being photographed. There are a number of locations in which the lens and sensor array system of the present invention may be placed in this camera and representative samples of these are shown simultaneously in FIG. 14 as positions A, B and C. In position A, light passing through lens 10 and mirror 300 is reflected from the mirror 305 to the CCD detector array and lens arrangement 330. At position B, light passing from the mirror 300 up through lens 312 and into prism 314 is received outside of prism 314 by a mirror 340 which reflects the light through a lens 350 to the CCD element and lens arrangement 355. In position C, light after it has left prism 314 passes through a partly reflecting mirror 360 where it is passed upwardly through a lens 362 to a CCD array and lens system 365. These and other positions will occur to those skilled in the art and are shown in FIG. 14 only for purposes of examples.

Figure 15:
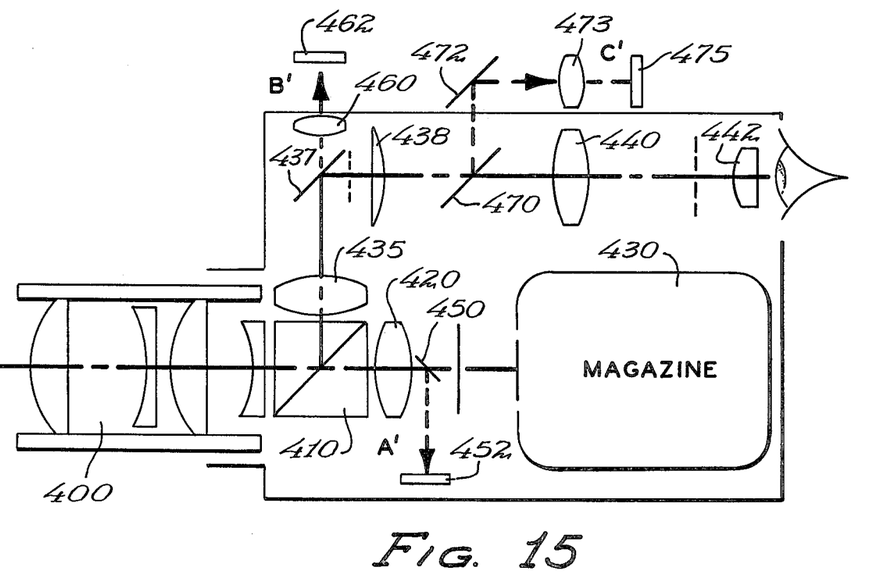
FIG. 15 shows a motion picture or television camera in cross section with several possible placements for the lens-detector combination of the present invention.

When the apparatus of the present invention is used with a motion picture or television camera, then the arrangement of CCD detectors and associated lenses may be placed in a number of different locations as will be seen in FIG. 15.

In FIG. 15 a diagrammatic view of a motion picture camera is shown having a zoom lens system 400 which receives light from a remote object and passes it through a beam splitter 410 to a lens 420 where it enters into the magazine 430 of the camera. Light is also reflected from the beam splitter 410 upwardly through a lens 435 to a mirror 437 where it is reflected through lenses 438, 440 and 442 to the eye of the observer. Here again, three of the possible locations for the combination CCD array and lens have been shown as positions A', B' and C'. In position A', light passing through the zoom lens system and the beam splitter 410 and lens 420 strikes a partially silvered mirror 450 and passes down to the CCD array and lens system 452. In position B', light after it has left lens 435 passes through partly silvered mirror 437 and a lens 460 to a CCD array and lens system 462. In position C', light after it has passed through lens 438 is reflected off a partially silvered mirror 470 and a mirror 472 through a lens 473 to a CCD detector array and lens system 475. Other locations for the CCD array will occur to those skilled in the art and the three shown in FIG. 15 have been placed there only for purpose of giving examples.

It is thus seen that I have provided a novel automatic focusing system utilizing charged coupled devices or charge injection devices which are numerous and of small dimensions so as to provide greater accuracy. There are no moving parts associated with the distance determining or error mechanism of the automatic focus system which simplifies the apparatus and saves cost and weight. Furthermore, I have provided an auto focus system which may be utilized in a through-the-lens or motion picture camera without the need for complex additional optical systems in these cameras thus saving cost, weight and complexity. While I have described in detail the preferred embodiment of my invention, many changes will occur to those skilled in the art. For example, while I have shown the light from the taking lens being separated into parts where the upper portion produces the first energy distribution pattern and the lower portion produces the second energy distribution pattern, the areas could be side by side or only portions which are less than those illustrated in this example. Accordingly, I do not wish to be limited by the showings used in connection with the description of the preferred embodiment but intend only to be limited by the appended claims.

The embodiments of the invention in which an exclusive property or right is claimed are defined as follows:

1. Apparatus for producing an output that varies with the distance to an object comprising:
   lens means;
   radiation discriminating means, said lens means receiving radiation from the object and transmitting it to said radiation discriminating means, said radiation discriminating means producing a first radiation distribution pattern from radiation received from a first portion of said lens means and a second radiation distribution pattern from radiation received from a second portion of said lens means, the first radiation distribution pattern being in superimposition with respect to the second radiation distribution pattern at a first image plane when the object is at a predetermined distance from said lens means, the first and second radiation distribution patterns moving out of superimposition as the object moves to distances other than the predetermined distance, the amount of movement of the radiation distribution patterns from superimposition being indicative of the change of distance between the object and said lens means from the predetermined distance;

first radiation responsive detector means mounted proximate to the image plane to receive radiation in the first of the radiation distribution patterns and to produce a first output signal in accordance therewith;

second radiation responsive detector means mounted proximate the image plane to receive radiation in the second of the radiation distribution patterns and to produce a second output signal in accordance therewith; and means connected to said first and second radiation responsive detector means to receive the first and second output signals therefrom and to produce a resultant output indicative of the amount of movement of the first and second radiation distribution patterns from superimposition.

2. Apparatus according to claim 1 wherein the lens means includes the taking lens of a camera.

3. Apparatus according to claim 1 wherein the radiation discriminating means comprises a plurality of secondary lenses each having a second image plane and being mounted proximate the location of the first and second radiation distribution patterns.

4. Apparatus according to claim 3 wherein the first detector means comprises a first plurality of individual detectors a different one of which is mounted proximate the image plane of each of the secondary lenses and the second detector means comprises a second plurality of individual detectors, a different one of which is mounted proximate the image plane of each of the secondary lenses so that proximate the image plane of each of the secondary lenses lies two individual detectors, one from the first plurality of individual detectors and one from the second plurality of individual detectors.

5. Apparatus according to claim 4 wherein the first and second plurality of individual detectors are charge coupled devices.

6. Apparatus according to claim 4 wherein the first and second plurality of detectors are charge injection devices.

7. Apparatus for use in automatically focusing a camera having a taking lens and motive means operable to move the taking lens to a desired position to produce a focussed image of a remote object, comprising:

a plurality of radiation responsive detectors arranged in pairs;

a plurality of light discriminating means mounted proximate the image plane of the taking lens so as to produce a plurality of images of a portion of the exit pupil of the taking lens, each of the images comprising radiation originating from a different point in the scene being viewed including the remote object;

means mounting each of the pairs of detectors so that both detectors of each pair receive the radiation in one of the plurality of images, but so that the two detectors in each of the pairs receives radiation from a different portion of the exit pupil of the taking lens, each detector producing an output signal indicative of the intensity of radiation it receives; and signal responsive means connected to the plurality of detectors and operable to compare the output signals of first detectors in each pair with the output signals of second detectors in each pair to determine a correspondence condition and to produce a resultant signal which changes with the correspondence condition, said resultant signal being usable by the motive means to move the taking lens to the desired position.

8. Apparatus according to claim 7 wherein the light discriminating means is a plurality of secondary lenses.

9. Apparatus according to claim 8 wherein each detector pair is placed proximate the image plane of a different one of the second lenses.

10. Apparatus according to claim 9 wherein the detectors are charge coupled devices.

* * * * *